US008851593B1

(12) United States Patent
Tanabe

(10) Patent No.: US 8,851,593 B1
(45) Date of Patent: Oct. 7, 2014

(54) IMAGE PROCESSING APPARATUS, IMAGE FORMING APPARATUS, NON-TRANSITORY COMPUTER READABLE MEDIUM, AND IMAGE PROCESSING METHOD

(71) Applicant: Fuji Xerox Co., Ltd, Tokyo (JP)

(72) Inventor: Ko Tanabe, Yokohama (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 13/971,528

(22) Filed: Aug. 20, 2013

(30) Foreign Application Priority Data

Mar. 14, 2013 (JP) ................................. 2013-051837

(51) Int. Cl.
B41J 29/38 (2006.01)
B41J 2/07 (2006.01)
(52) U.S. Cl.
CPC ........................................ B41J 2/07 (2013.01)
USPC ............................................................ 347/5
(58) Field of Classification Search
CPC ...... G06F 3/1208; G06F 3/122; G06F 3/1297
USPC ...................... 347/5, 19; 358/1.13, 1.15, 3.28
See application file for complete search history.

(56) References Cited

U.S. PATENT DOCUMENTS 6,116,510 A * 9/2000 Nishino ......................... 235/494
7,567,355 B2 * 7/2009 Matsunoshita ............... 358/1.13
7,619,766 B2 * 11/2009 Tsuzuki ....................... 358/1.15

FOREIGN PATENT DOCUMENTS

JP 2009-056631 A 3/2009
JP 2009-083365 A 4/2009

* cited by examiner

Primary Examiner — An Do
(74) Attorney, Agent, or Firm — Sughrue Mion, PLLC

(57) ABSTRACT

An image processing apparatus includes a memory, a receiving unit, a detector, a generation unit, a determination unit, and an alert unit. The memory stores output characteristic information, information on image output characteristics of a printer, which is specified for output. The receiving unit receives a print command. The detector detects a one-dimensional code in accordance with a received print command. The generation unit generates print data in accordance with a received print command. The determination unit determines, in a case where a one-dimensional code has been detected, whether or not a printer, which is specified for output, is capable of printing the one-dimensional code with a predetermined print quality or higher by referring to the stored output characteristic information. The alert unit issues an alert in a case where the printer is incapable of printing the one-dimensional code with the predetermined print quality or higher.

13 Claims, 12 Drawing Sheets

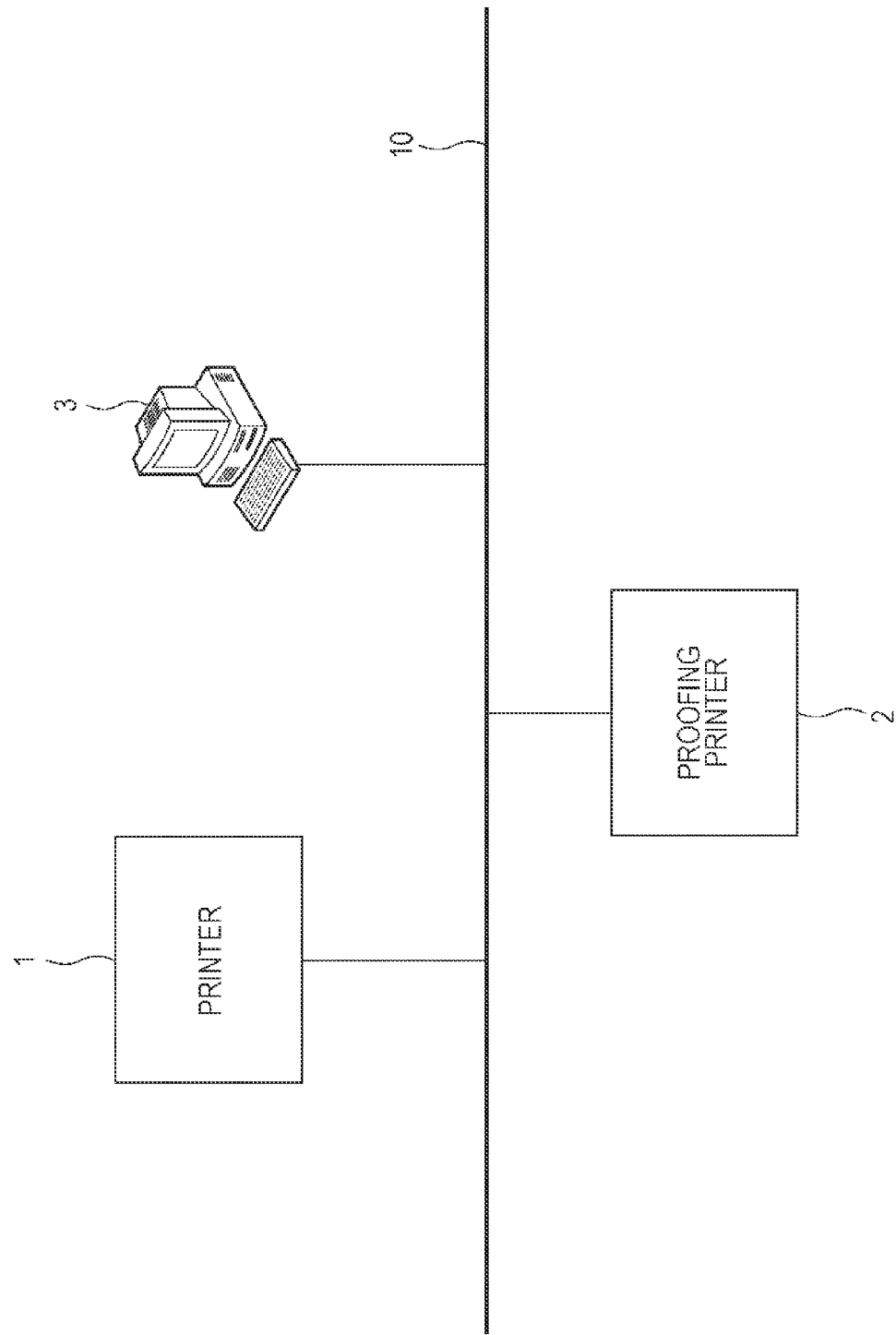

FIG. 6

| OUTPUT CHARACTERISTIC INFORMATION: PRINTER 1 ||
|---|---|
| PRINTING METHOD | INKJET PRINTING (DYES) |
| OUTPUT RESOLUTION | 600 dpi |
| PRINT SPEED | 200 m/min |

FIG. 7

| DETERMINATION TABLE CONDITIONS / PRINTING METHOD | OUTPUT RESOLUTION | PRINT SPEED | BARCODE ORIENTATION |
|---|---|---|---|
| INKJET PRINTING (DYES) | 1200 dpi OR HIGHER | 150 m/min OR HIGHER | PERPENDICULAR |
| INKJET PRINTING (PIGMENTS) | 1200 dpi OR HIGHER | 200 m/min OR HIGHER | PERPENDICULAR |
| XEROGRAPHY | 1200 dpi OR HIGHER | 200 m/min OR HIGHER | |
| OFFSET PRINTING | 2400 dpi OR HIGHER | 200 m/min OR HIGHER | |

IMAGE PROCESSING APPARATUS, IMAGE FORMING APPARATUS, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2013-051837 filed Mar. 14, 2013.

BACKGROUND

Technical Field

The present invention relates to an image processing apparatus, an image forming apparatus, a non-transitory computer readable medium, and an image processing method.

SUMMARY

According to an aspect of the invention, there is provided an image processing apparatus including a memory, a receiving unit, a detector, a generation unit, a determination unit, and an alert unit. The memory stores output characteristic information, which is information on image output characteristics of a printer, which is a printer specified for output. The receiving unit receives a print command. The detector detects a one-dimensional code in accordance with a print command received by the receiving unit. The generation unit generates print data in accordance with a print command received by the receiving unit. The determination unit determines, in a case where a one-dimensional code whose data is included in print data generated by the generation unit has been detected by the detector, whether or not a printer, which is a printer specified for output, is capable of printing the one-dimensional code with a predetermined print quality or higher by referring to the output characteristic information stored in the memory. The alert unit issues an alert in a case where the determination unit determines that the printer, which is a printer specified for output, is incapable of printing the one-dimensional code with the predetermined print quality or higher.

BRIEF DESCRIPTION OF THE DRAWINGS

An exemplary embodiment of the present invention will be described in detail based on the following figures, wherein:

FIG. 3 is a diagram illustrating an image forming system according to an exemplary embodiment of the invention;

FIG. 6 is a diagram illustrating an example of output characteristic information on a printer according to the exemplary embodiment of the invention;

FIG. 7 is a diagram illustrating an example of a determination table stored in a storage unit according to the exemplary embodiment of the invention;

DETAILED DESCRIPTION

The barcode orientation of a barcode (one-dimensional code) and output characteristics of a printer will be first described, and then an exemplary embodiment of the invention will be described.

Figure 1:
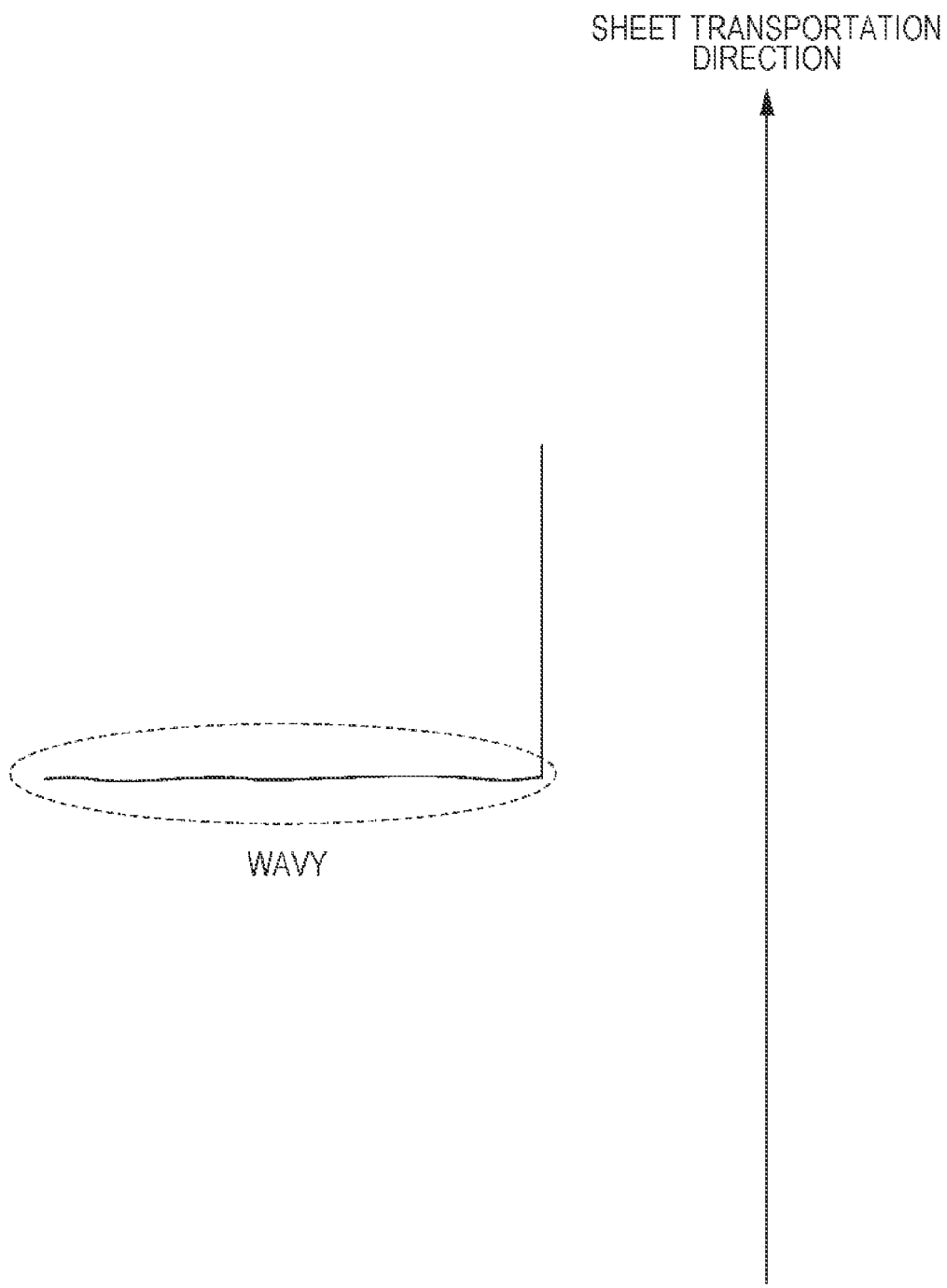
FIG. 1 is a diagram used to describe output characteristics of a printer.

For example, in the case where an inkjet printer prints a thin line such as a one-dot line, there is a direction in which printing of a one-dot line is difficult. Specifically, there is a direction in which a printed line tends to be wavy as illustrated in FIG. 1 due to the landing timing of or the landing deviation of discharged ink droplets, spreading of ink, or the like. In particular, printed results tend to be affected by the landing timing of or the landing deviation of discharged ink droplets more greatly in line-head type printing than in serial-head type printing. In line-head type printing, printing is performed by a fixed print head in which nozzles from which ink is discharged are arranged in rows parallel to one another. In serial-head type printing, printing is performed by moving a print head in directions perpendicular to the sheet transportation direction such that the print head reciprocates. In this way, printers each have, as an output characteristic, a direction in which it is impossible to realize printing of an accurate line.

In the case where an image including thin lines such as a barcode is output, when printed lines are wavy, reading of such an output barcode may cause a read error. In particular, when a barcode to be identified on the basis of the thickness of each line, for example, a barcode based on CODE 128 is printed whose lines extend in a direction in which lines tend to be printed in a wavy manner, the probability of occurrence of read errors tends to be high when such an output barcode is read, CODE 128 being one of barcode systems.

Figure 2A:
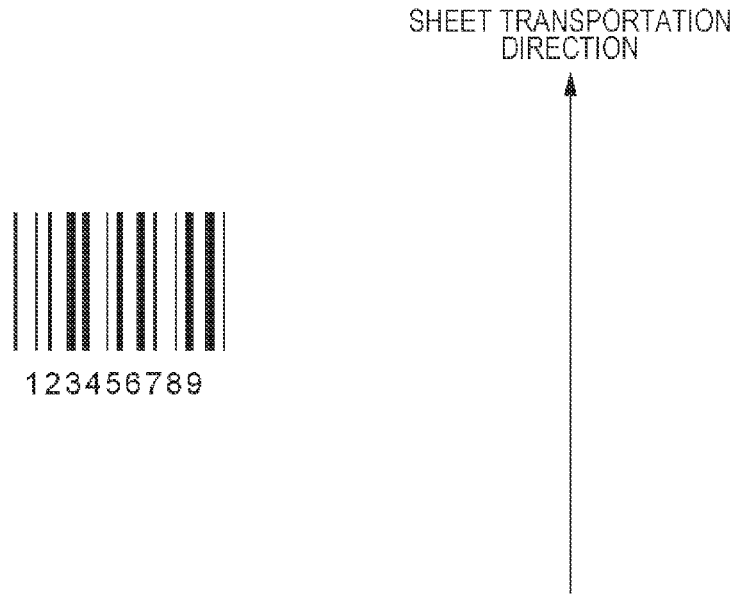
FIGS. 2A and 2B are diagrams used to describe a relationship between the orientation of a barcode and output characteristics of the printer.
Figure 2B:
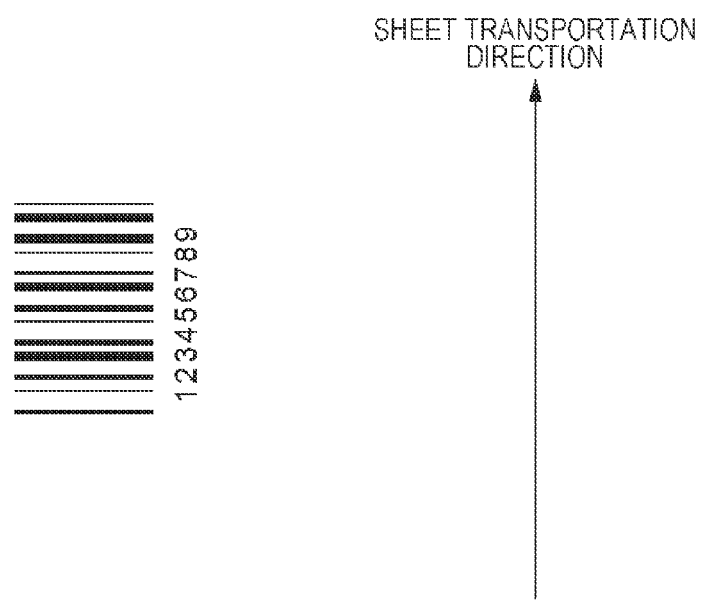

Thus, when a barcode is printed, there are printers that may degrade the print quality of the barcode, depending on the orientation of the barcode. For example, a printer will be described that has no issue when a line that extends in a direction parallel to the sheet transportation direction is printed but is not capable of printing an accurate line when a line extends in a direction perpendicular to the sheet transportation direction. With such a printer, as illustrated in FIG. 2A, there is no issue when a barcode whose lines extend in a direction parallel to the sheet transportation direction is printed. However, as illustrated in FIG. 2B, a barcode whose lines extend in a direction perpendicular to the sheet transportation direction is printed, printed lines tend to be wavy and a read error tends to occur when such a printed barcode is read.

Note that the print quality of a barcode does not depend simply on the orientation of the barcode. The printing method, output resolution, print speed, and the like of a printer greatly affect the print quality of a barcode, too.

Next, an exemplary embodiment of the invention will be described in detail with reference to the drawings.

FIG. 3 is a diagram illustrating a system configuration of an image forming system according to an exemplary embodiment of the invention. In the image forming system according to the exemplary embodiment, as illustrated in FIG. 3, a printer 1 that performs actual printing, a proofing printer 2 that has output characteristics different from those of the printer 1, and a terminal apparatus 3 are connected with each other via a network 10.

The printer 1 is a large inkjet printer, which employs a line-head type printing method. The printer 1 outputs an image on a sheet in accordance with a print job (a print command) transmitted from the terminal apparatus 3 via the network 10.

The proofing printer 2 is a printer that performs, before the printer 1 outputs print data, test printing upon receiving a print job from the terminal apparatus 3.

The terminal apparatus 3 transmits a print job to the printer 1 or the proofing printer 2 via the network 10 in accordance with an operation performed by a user.

Next, the hardware configuration of the proofing printer 2 according to the exemplary embodiment of the invention will be described in detail with reference to FIG. 4.

Figure 4:
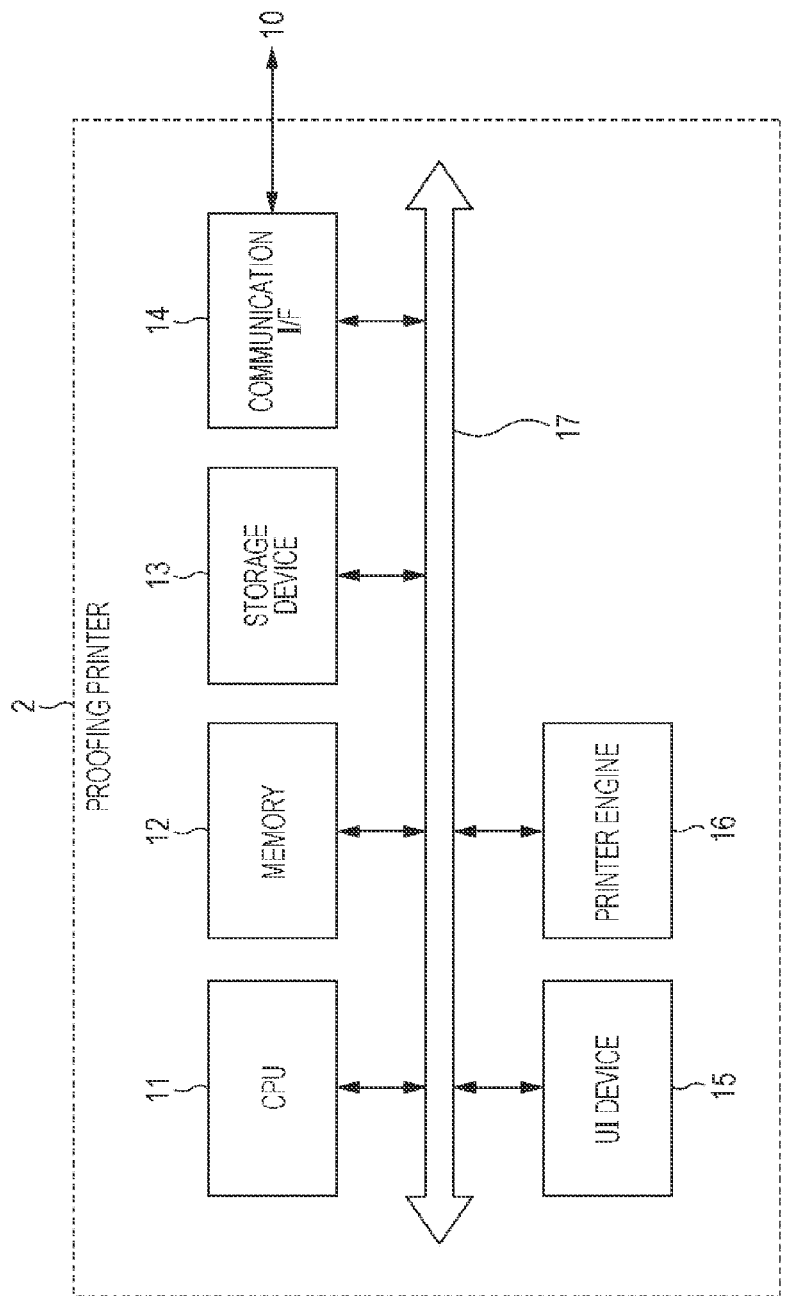
FIG. 4 is a block diagram illustrating a hardware configuration of a proofing printer according to the exemplary embodiment of the invention.

The proofing printer 2 includes, as illustrated in FIG. 4, a central processing unit (CPU) 11, a memory 12, a storage device 13, a communication interface (I/F) 14, a user interface (UI) device 15, and a printer engine 16. An example of the storage device 13 is a hard disk drive (HDD). The communication I/F 14 transmits and receives data to and from the terminal apparatus 3 via the network 10. The UI device 15 includes a touch screen or a liquid crystal display and a keyboard. These components are connected with each other via a control bus 17.

The CPU 11 executes predetermined processing in accordance with a control program stored in the memory 12 or the storage device 13, and controls operation of the proofing printer 2. Note that, in the exemplary embodiment, the CPU 11 has been described as a CPU that reads the control program stored in the memory 12 or the storage device 13 and executes the control program; however, such a program may be stored in a storage medium such as a compact disc read-only memory (CD-ROM) and provided to the CPU 11.

Figure 5:
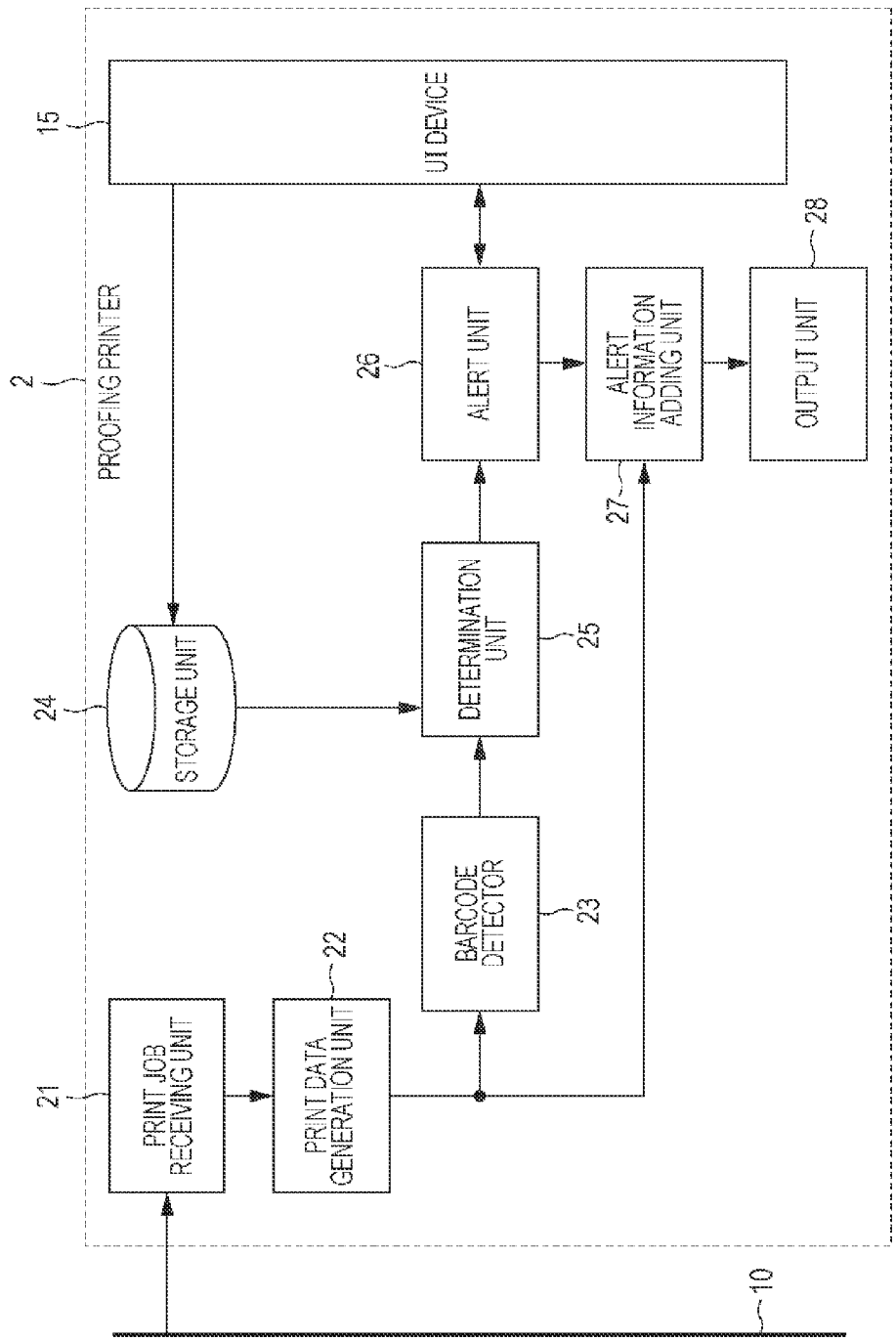
FIG. 5 is a block diagram illustrating a functional configuration of the proofing printer according to the exemplary embodiment of the invention.

FIG. 5 is a diagram illustrating a functional configuration of the proofing printer 2 realized by executing the above-described control program.

As illustrated in FIG. 5, the proofing printer 2 according to the exemplary embodiment includes a print job receiving unit 21, a print data generation unit 22, a barcode detector 23, a storage unit 24, a determination unit 25, an alert unit 26, an alert information adding unit 27, an output unit 28, and the UI device 15. The UI device 15 receives an operation performed by a user using a touch screen or the like.

The print job receiving unit 21 receives a print job generated by the terminal apparatus 3 and expressed in, for example, a page description language, via the network 10.

The print data generation unit 22 performs various types of image processing on print data received by the print job receiving unit 21 and generates raster print data, an example of the various types of image processing being raster image processing (RIP). In addition, when a print job includes a command for imposition printing, the print data generation unit 22 generates print data of pages, print data of each page including image data of plural pages, in accordance with the command.

The barcode detector 23 scans and reads print data generated by the print data generation unit 22, and detects the presence or absence of an image of a barcode. Hereinafter, an image of a barcode will be simply referred to as a barcode. In addition, in the case where a barcode is detected from print data, the barcode detector 23 detects the orientation of the barcode in the print data.

The storage unit 24 stores output characteristic information, which is information on image output characteristics of the printer 1. The printer 1 is a printer specified for output. An example of the output characteristic information on the printer 1 is illustrated in FIG. 6. With reference to FIG. 6, the output characteristic information includes information on a printing method, an output resolution, a print speed, and the like of the printer 1. Note that the output characteristic information does not have to include information on all the printing method, output resolution, and print speed. It is desirable that the output characteristic information include information on at least one of the printing method, output resolution, and print speed or information on a combination of the printing method, output resolution, and print speed.

The example illustrated in FIG. 6 shows that the printing method of the printer 1 is "inkjet printing (dyes)", the output resolution is "600 dpi", and the print speed is "200 m/min". Note that the output characteristic information may be acquired directly from the printer 1 or may be input by a user. Note that the output characteristic information in the exemplary embodiment is a mere example. The invention is not limited this output characteristic information.

The storage unit 24 stores a determination table that includes conditions used to determine whether or not the printer 1 is capable of printing a certain barcode with a predetermined print quality or higher, the printer 1 being a printer specified for output. The determination table is illustrated in FIG. 7. Referring to FIG. 7, the determination table includes conditions used to determine whether or not a predetermined print quality or higher is achieved when printing methods such as inkjet printing (dyes), inkjet printing (pigments), xerography, and offset printing are each used. For each of the printing methods, an output resolution, a print speed, and the orientation of a barcode (hereinafter also referred to as a "barcode orientation") are set as conditions. The orientation of a barcode refers to the direction in which lines (thin lines) of the barcode extend with respect to the sheet transportation direction.

In the example illustrated in FIG. 7, the printing method "inkjet printing (dyes)" has conditions, which have been set, such as "1200 dpi or higher" in the "output resolution" column, "150 m/min or higher" in the "print speed" column, and "perpendicular" in the "barcode orientation" column. In addition, the printing method "inkjet printing (pigments)" has conditions, which have been set, such as "1200 dpi or higher" in the "output resolution" column, "200 m/min or higher" in the "print speed" column, and "perpendicular" in the "barcode orientation" column. Furthermore, the printing method "xerography" has conditions, which have been set, such as "1200 dpi or higher" in the "output resolution" column and "200 m/min or higher" in the "print speed" column. In addition, the printing method "offset printing" has conditions, which have been set, such as "2400 dpi or higher" in the "output resolution" column and "200 m/min or higher" in the "print speed" column. Note that the determination table may be set by an input operation performed to the UI device 15 by a user or may be stored in the proofing printer 2 in advance. Here, the determination table in the exemplary embodiment is a mere example, and thus the invention is not limited these conditions.

The UI device 15 functions as a setting unit that sets an alert method to be performed by the alert unit 26, in accordance with a user operation. Specifically, the UI device 15 sets an alert method in which an alert message is printed on a sheet for test printing, an alert method in which an alert message is displayed on the screen, or an alert method in which the color of a certain barcode is changed to, for example, red when it is determined that it is not possible to print the certain barcode with a predetermined print quality or higher. Moreover, the UI device 15 may set an alert method used in the case where plural barcodes are included in print data, the alert method being used to determine whether or not to issue an alert in accordance with the type of barcode.

In the case where a barcode or barcodes have been detected by the barcode detector 23 from print data, for the barcode or each of the barcodes, the determination unit 25 determines whether or not the printer 1 is capable of printing the barcode with a predetermined print quality or higher by referring to the output characteristic information stored in the storage unit 24. In the exemplary embodiment, the determination unit 25 compares, as illustrated in FIGS. 6 and 7, the output characteristic information with the determination table stored in the storage unit 24. In the case where pieces of information included in the output characteristic information and the orientation of the barcode, whose data is included in the print data generated by the print data generation unit 22, do not meet conditions included in the determination table, the determination unit 25 determines that the printer 1 is capable of printing the barcode with a predetermined print quality or higher. In addition, the determination unit 25 compares the output characteristic information with the determination table stored in the storage unit 24. In the case where any of the pieces of information included in the output characteristic information and the orientation of the barcode, whose data is included in the print data generated by the print data generation unit 22, meets the conditions included in the determination table, the determination unit 25 determines that the printer 1 is incapable of printing the barcode with the predetermined print quality or higher.

Specifically, since the printing method is "inkjet printing (dyes)" with reference to the output characteristic information on the printer 1 as illustrated in FIG. 6, the determination unit 25 compares conditions set for "inkjet printing (dyes)" in the determination table illustrated in FIG. 7 with pieces of information included in the output characteristic information. Here, in the output characteristic information on the printer 1, the output resolution is 600 dpi and the print speed is 200 m/min. Since the printing method "inkjet printing (dyes)" in the determination table has conditions, which have been set, such as "1200 dpi or higher" in the "output resolution" column and "150 m/min or higher" in the "print speed" column, the output resolution does not meet a condition included in the determination table; however, the print speed meets a condition included in the determination table. In this case, the determination unit 25 determines that the printer 1 is incapable of printing the barcode detected by the barcode detector 23 with a predetermined print quality or higher.

Moreover, as illustrated in FIG. 7, the printing method "inkjet printing (dyes)" in the determination table has conditions, which have been set, such as "perpendicular" in the "barcode orientation" column. Thus, in the case where a direction in which lines of a barcode detected by the barcode detector 23 extend is parallel to the sheet transportation direction, the determination unit 25 determines that the orientation of the barcode does not meet the condition set in the "barcode orientation" column in the determination table. In the case where a direction in which lines of a barcode detected by the barcode detector 23 extend is perpendicular to the sheet transportation direction, the determination unit 25 determines that the orientation of the barcode meets the condition set in the "barcode orientation" column in the determination table. As a result, the determination unit 25 determines that the printer 1 is incapable of printing the barcode detected by the barcode detector 23 with a predetermined print quality or higher.

Note that, in the case where a command for imposition printing is included in a print job, the determination unit 25 takes into account the fact that images of some pages are rotated in imposition printing. For barcodes rotated due to imposition printing, the determination unit 25 determines whether or not the orientation of each barcode meets the condition set in the "barcode orientation" column in the determination table. This is because, in the case of imposition printing, the orientation of each page on a sheet may be different from the original orientation.

The alert unit 26 issues an alert in a method set in advance, in the case where the determination unit 25 determines that the printer 1, which is a printer specified for output, is incapable of printing a certain barcode with a predetermined print quality or higher.

The alert information adding unit 27 adds alert information to print data in the case where the determination unit 25 has determined that the printer 1, which is a printer specified for output, is incapable of printing a certain barcode with a predetermined print quality or higher and the alert unit 26 has issued an alert, the alert information being used to identify the certain barcode.

The output unit 28 outputs, on a sheet, an image based on print data to which alert information has been added by the alert information adding unit 27.

Figure 8:
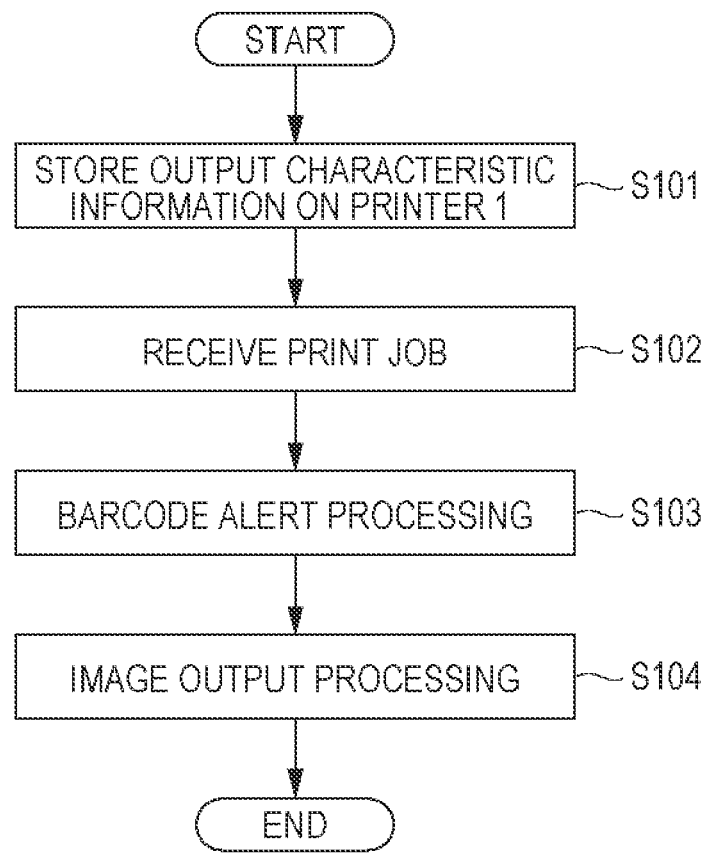
FIG. 8 is a flowchart illustrating overall operation of the proofing printer according to the exemplary embodiment of the invention.

Next, the operation of the entire image forming system according to the exemplary embodiment will be described in detail with reference to a flowchart illustrated in FIG. 8.

First, the proofing printer 2 stores output characteristic information on the printer 1 in the storage unit 24 in accordance with a user operation performed to the UI device 15 (in step S101).

Next, the terminal apparatus 3 generates a print job to make the printer 1 perform actual printing. The terminal apparatus 3 transmits the generated print job to the proofing printer 2 so as to make the proofing printer 2 perform test printing. Then, the proofing printer 2 receives the print job from the terminal apparatus 3 (in step S102).

The proofing printer 2 performs barcode alert processing in accordance with the received print job (in step S103). Note that details of barcode alert processing will be described later.

The proofing printer 2 outputs an image based on the received print job on a sheet (in step S104).

Figure 9:
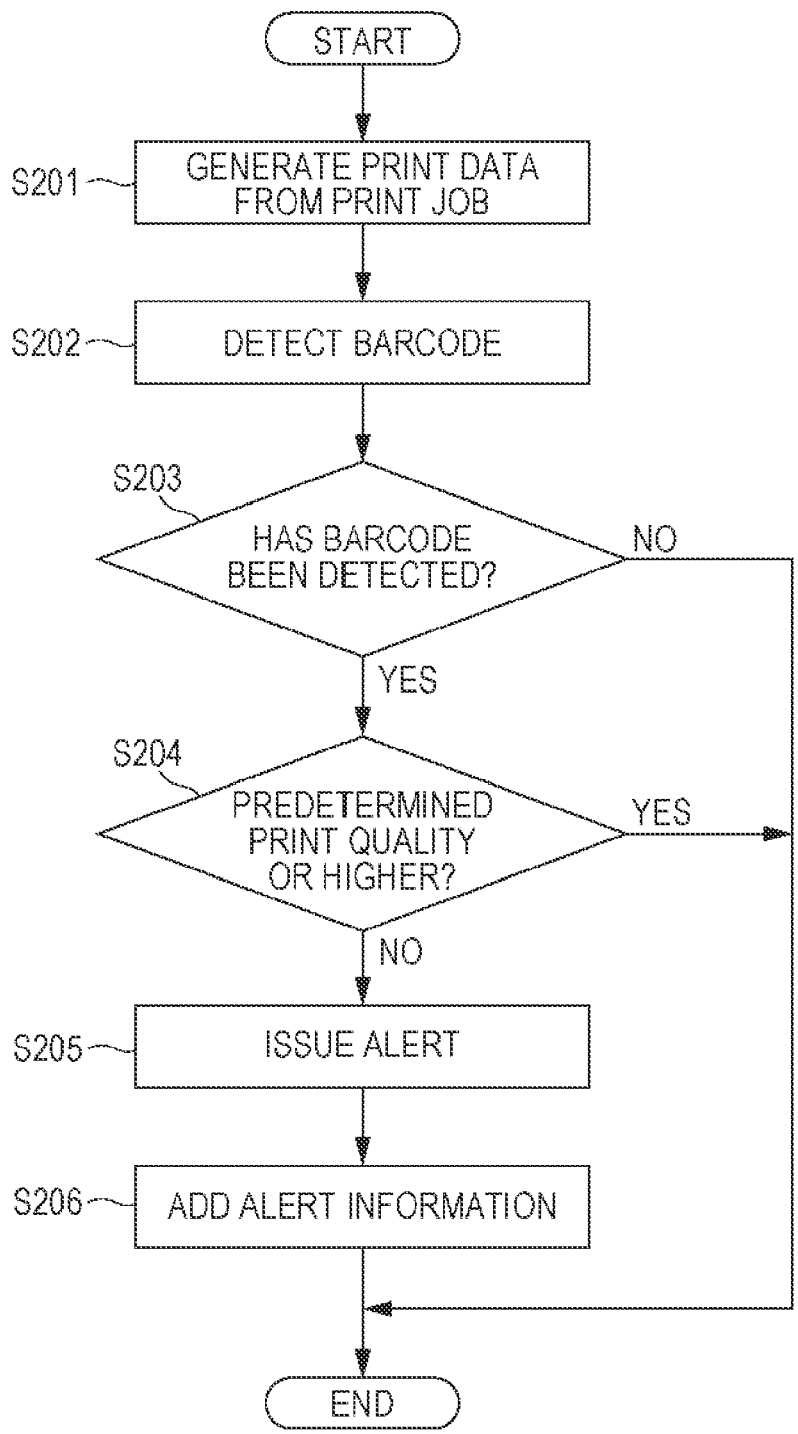
FIG. 9 is a flowchart illustrating alert processing performed by the proofing printer according to the exemplary embodiment of the invention.

Next, the details of barcode alert processing in step S103 illustrated in the flowchart of FIG. 8 will be described with reference to a flowchart illustrated in FIG. 9.

First, the print data generation unit 22 generates print data in accordance with a print job received by the print job receiving unit 21 (in step S201).

Then, the barcode detector 23 detects a barcode from the generated print data (in step S202). In the case where a barcode has been detected, the procedure proceeds to step S204. In the case where no barcodes have been detected, the processing is completed (in step S203).

In step S203, in the case where a barcode has been detected from the print data, the determination unit 25 refers to the output characteristic information on the printer 1 stored in the storage unit 24 and determines whether or not the printer 1 is capable of printing the barcode with a predetermined print quality or higher (in step S204).

In step S204, in the case where it is determined that the printer 1 is capable of printing the barcode with the predetermined print quality or higher (YES in step S204), the processing is completed.

In step S204, in the case where it is determined that the printer 1 is incapable of printing the barcode with the predetermined print quality or higher (NO in step S204), the alert unit 26 issues an alert in an alert method set in advance (in step S205). For example, the alert unit 26 makes the UI device 15 display an alert screen and alerts the user that a printed result may include a barcode whose print quality is lower than the predetermined print quality.

In the case where the alert method set in advance includes a method in which an alert is output on a sheet, the alert information adding unit 27 adds alert information to the print data (in step S206).

Specifically, for example, in the case where a print job includes a command for imposition printing, since a condition "perpendicular" is set in the "barcode orientation" column in the determination table, when print data resulting from rotation performed in accordance with the command for imposition printing includes a barcode whose orientation is perpendicular to the sheet transportation direction, the alert unit 26 commands the alert information adding unit 27 to change the print color of the barcode to red. Moreover, for example, the alert unit 26 commands the alert information adding unit 27 to add some kind of mark or identification information to the barcode.

Furthermore, in the case where the alert unit 26 issues an alert, the alert information adding unit 27 may add an alert message indicating that a barcode may be incorrectly read, as alert information, to the image data.

Next, specific examples of the alert method according to the exemplary embodiment will be described with reference to FIGS. 10 to 12.

Figure 10:
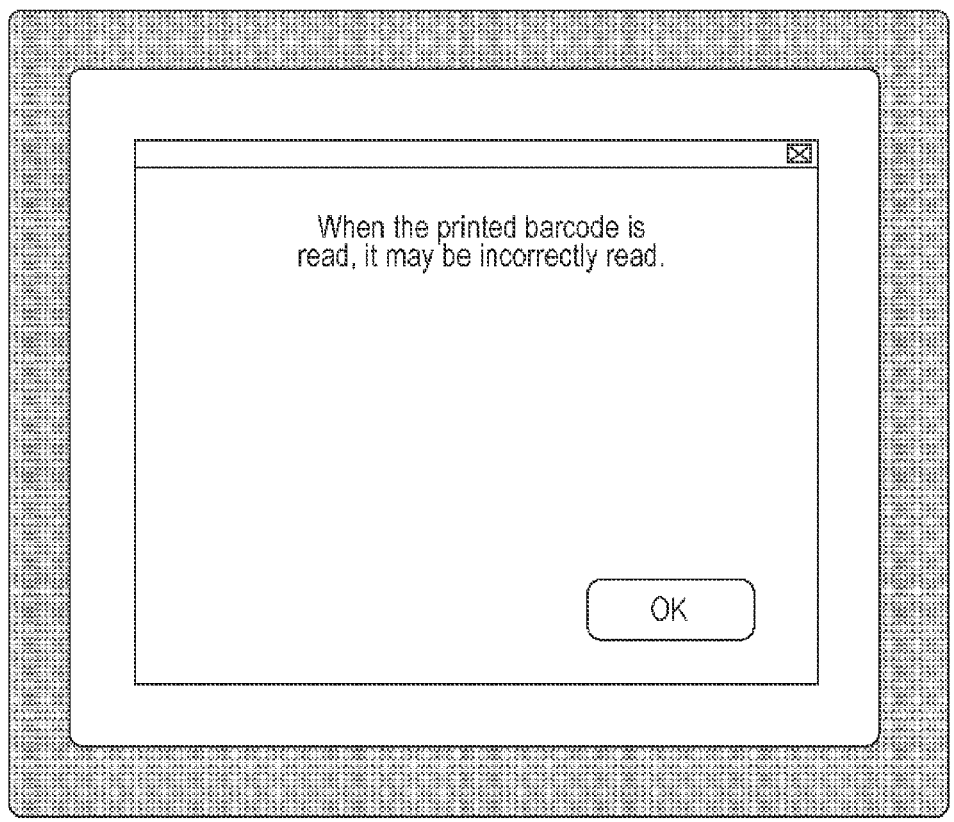
FIG. 10 is a diagram illustrating an example of the case where a user is alerted by an alert screen indicating that a barcode that may be printed with a print quality lower than a predetermined print quality may be included in a printed result.

FIG. 10 is a diagram illustrating an example of the case where a user is alerted by an alert screen indicating that a barcode that may be printed with a print quality lower than the predetermined print quality may be included in a printed result.

Figure 11:
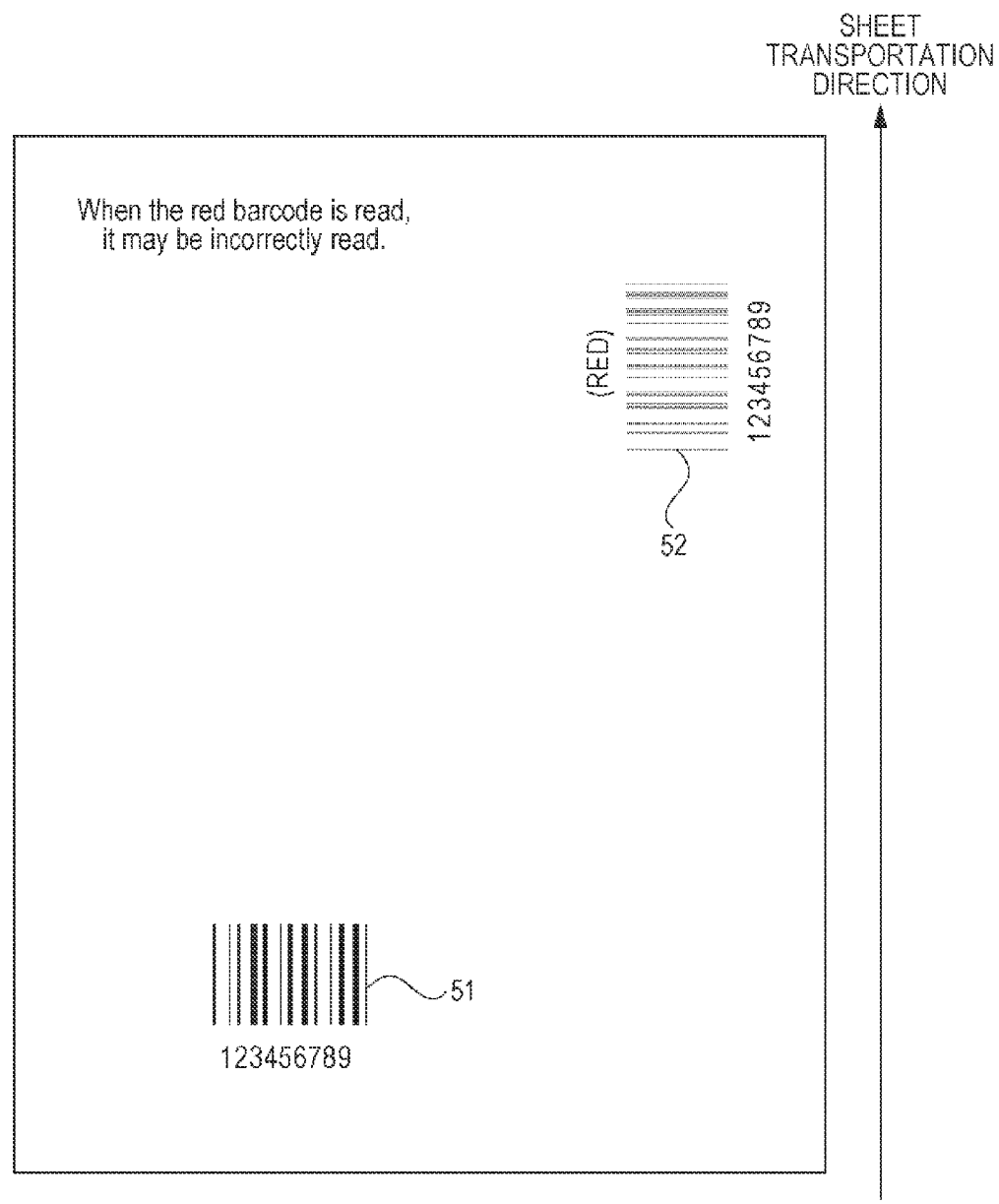
FIG. 11 is a diagram illustrating an example of alert information according to the exemplary embodiment of the invention.

FIG. 11 is a diagram illustrating an exemplary alert in the case where one page includes two barcodes 51 and 52 and the orientation of the barcode 52 meets a condition set in the determination table. As illustrated in FIG. 10, the determination unit 25 has determined that the orientation of the barcode 51 does not meet a condition "perpendicular" set in the "barcode orientation" column in the determination table. Thus, the output unit 28 outputs the barcode 51 in black. In contrast, the determination unit 25 has determined that the orientation of the barcode 52 meets the condition "perpendicular" set in the "barcode orientation" column in the determination table. Thus, the alert unit 26 commands the alert information adding unit 27 to add, to image data, a command for changing the print color of the barcode 52 from black to red as alert information. Furthermore, the alert information adding unit 27 adds an alert message such as "when the red barcode is read, it may be incorrectly read." to the image data.

Figure 12:
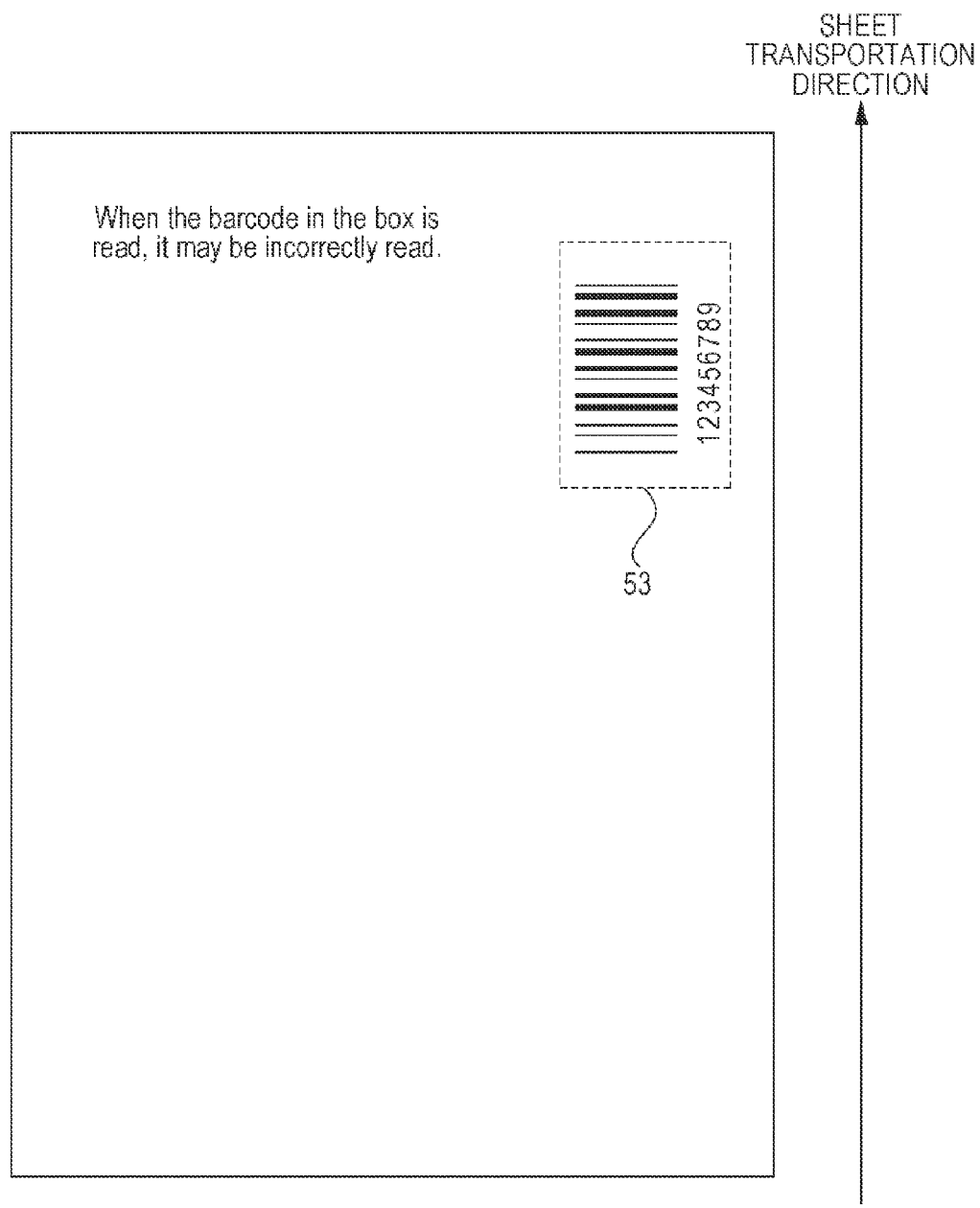
FIG. 12 is a diagram illustrating another example of alert information according to the exemplary embodiment of the invention and is a diagram illustrating an example of an alert screen according to the exemplary embodiment of the invention.

FIG. 12 is a diagram illustrating an example of the case where a box is drawn around a barcode that may be printed with a print quality lower than a predetermined print quality. As illustrated in FIG. 12, in the case where the determination unit 25 has determined that it is not possible to print a barcode whose data is included in print data with a predetermined print quality or higher, the alert unit 26 commands the alert information adding unit 27 to add a box 53, as alert information, around the barcode whose data is included in the print data. Furthermore, the alert information adding unit 27 adds an alert message such as "when the barcode in the box is read, it may be incorrectly read." to the image data.

Moreover, the presence or absence of a barcode is detected by scanning and reading generated print data in the exemplary embodiment described above. However, the invention is not limited such an exemplary embodiment. For example, the barcode detector 23 may detect the presence or absence of a barcode by analyzing a visualization instruction included in a print job. Furthermore, when the print data generation unit 22 performs RIP processing in accordance with a print job, the print data generation unit 22 may generate intermediate data, and the barcode detector 23 may detect the presence or absence of a barcode by analyzing this intermediate data.

In addition, the determination unit 25 determines whether or not the printer 1 is capable of printing a barcode with a predetermined print quality or higher by referring to output characteristic information on the printer 1 stored in the storage unit 24 in the exemplary embodiment described above, the printer 1 being a printer specified for output. However, a level at which an alert is issued may be set in accordance with the type of barcode, the line width of barcode, or the like. For example, when the lines of a barcode are thick, an alert is not issued under any conditions. Alternatively, determination as to whether an alert should be issued may be more strictly performed in the case where the lines of a barcode are thin.

Moreover, alert processing is performed in the proofing printer 2 in the exemplary embodiment described above. However, similar alert processing may be performed when image processing in which a print job is generated is performed in the terminal apparatus 3. In this case, the output characteristic information on the printer 1 should be stored in the terminal apparatus 3. Moreover, in this case, when the terminal apparatus 3 transmits a print job to the proofing printer 2, the terminal apparatus 3 determines whether or not it is possible to print a barcode whose data is included in a print job with a predetermined print quality or higher by referring to the output characteristic information in the terminal apparatus 3. In the case where the terminal apparatus 3 determines that it is impossible to print the barcode with a predetermined print quality or higher, it is desirable that an alert screen be displayed on the display screen of the terminal apparatus 3 or alert information be added to the print job.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory that stores output characteristic information, which is information on image output characteristics of a printer, which is a printer specified for output;

a receiving unit that receives a print command;
a detector that detects a one-dimensional code in accordance with a print command received by the receiving unit;
a generation unit that generates print data in accordance with a print command received by the receiving unit;
a determination unit that determines, in a case where a one-dimensional code whose data is included in print data generated by the generation unit has been detected by the detector, whether or not a printer, which is a printer specified for output, is capable of printing the one-dimensional code with a predetermined print quality or higher by referring to the output characteristic information stored in the memory; and
an alert unit that issues an alert in a case where the determination unit determines that the printer, which is a printer specified for output, is incapable of printing the one-dimensional code with the predetermined print quality or higher.

2. The image processing apparatus according to claim 1, further comprising a setting unit that sets a method in which the alert unit issues an alert.

3. The image processing apparatus according to claim 2, wherein the detector detects presence or absence of data of a one-dimensional code from a visualization instruction included in the print command.

4. The image processing apparatus according to claim 2, wherein the detector detects presence or absence of a one-dimensional code from print data generated by the generation unit.

5. The image processing apparatus according to claim 2,
wherein the generation unit generates intermediate data in accordance with a print command received by the receiving unit, and
the detector detects a one-dimensional code from intermediate data generated by the generation unit.

6. The image processing apparatus according to claim 1, wherein the detector detects presence or absence of data of a one-dimensional code from a visualization instruction included in the print command.

7. The image processing apparatus according to claim 1, wherein the detector detects presence or absence of a one-dimensional code from print data generated by the generation unit.

8. The image processing apparatus according to claim 1,
wherein the generation unit generates intermediate data in accordance with a print command received by the receiving unit, and
the detector detects a one-dimensional code from intermediate data generated by the generation unit.

9. The image processing apparatus according to claim 1, wherein the output characteristic information is information on at least one of a printing method, an output resolution, and a print speed of a printer, which is a printer specified for output, or information on a combination of the printing method, output resolution, and print speed.

10. An image forming apparatus comprising:
a memory that stores output characteristic information, which is information on image output characteristics of a printer, which is a printer specified for output to perform actual printing;
a receiving unit that receives a print command;
a detector that detects a one-dimensional code in accordance with a print command received by the receiving unit;
a generation unit that generates print data in accordance with a print command received by the receiving unit;
a determination unit that determines, in a case where a one-dimensional code whose data is included in print data generated by the generation unit has been detected by the detector, whether or not a printer, which is a printer specified for output, is capable of printing the one-dimensional code with a predetermined print quality or higher by referring to the output characteristic information stored in the memory;
an alert unit that issues an alert in a case where the determination unit determines that the printer, which is a printer specified for output, is incapable of printing the one-dimensional code with the predetermined print quality or higher; and
an output unit that outputs an image based on print data generated by the generation unit on a sheet as test printing.

11. The image forming apparatus according to claim 10, further comprising an adding unit that adds alert information to the print data, the alert information being information used to identify a one-dimensional code determined by the determination unit to be a one-dimensional code that the printer, which is a printer specified for output, is incapable of printing with the predetermined print quality or higher.

12. A non-transitory computer readable medium storing a program causing a computer to execute a process, the process comprising:
receiving a print command;
detecting a one-dimensional code in accordance with a received print command;
generating print data in accordance with a received print command;
determining, in a case where a one-dimensional code whose data is included in generated print data has been detected, whether or not a printer, which is a printer specified for output, is capable of printing the one-dimensional code with a predetermined print quality or higher by referring to output characteristic information, which is information on image output characteristics of the printer, which is a printer specified for output; and
issuing an alert in a case where it is determined that the printer, which is a printer specified for output, is incapable of printing the one-dimensional code with the predetermined print quality or higher.

13. An image processing method comprising:
storing output characteristic information, which is information on image output characteristics of a printer, which is a printer specified for output;
receiving a print command;
detecting a one-dimensional code in accordance with a received print command;
generating print data in accordance with a received print command;
determining, in a case where a one-dimensional code whose data is included in generated print data has been detected, whether or not a printer, which is a printer specified for output, is capable of printing the one-dimensional code with a predetermined print quality or higher by referring to the stored output characteristic information; and
issuing an alert in a case where it is determined that the printer, which is a printer specified for output, is incapable of printing the one-dimensional code with the predetermined print quality or higher.

* * * * *